Patented June 18, 1929.

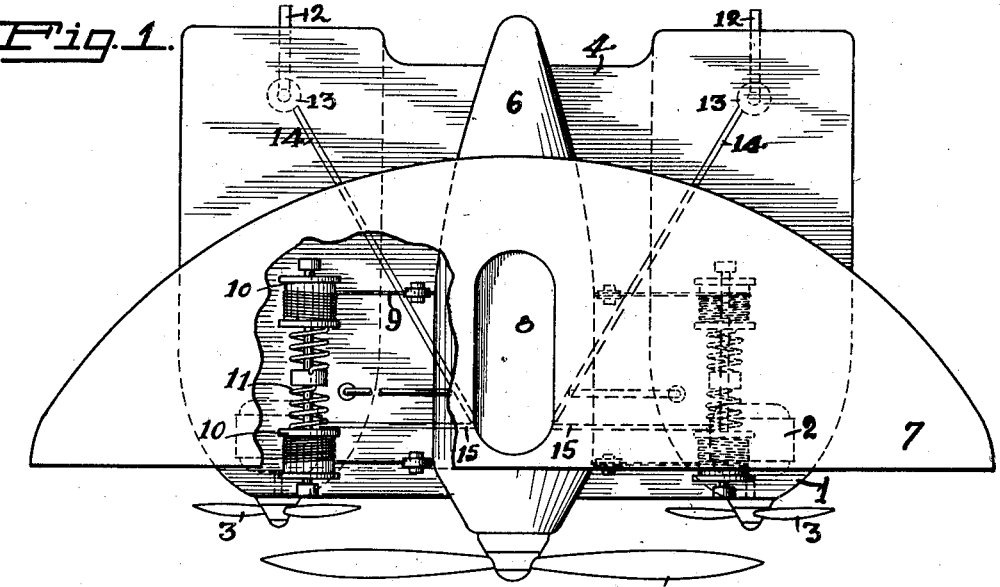

1,718,036

UNITED STATES PATENT OFFICE.

LEON F. DOUGLASS, OF MENLO PARK, CALIFORNIA.

FREIGHT AND PASSENGER CARRYING VEHICLE.

Application filed December 24, 1927. Serial No. 242,377.

This invention relates to improvements in passenger carrying vehicles of the type adapted to be propelled through the water by air traction means.

An object of my invention is to provide a vehicle for carrying passengers and freight which is propelled through water by air traction means.

Another object of my invention is to provide a vehicle for carrying freight and passengers wherein is embodied a plurality of boats adapted to rest on water and an airplane flexibly connected to the boats for assisting in the propulsion of the boats.

Another object of my invention is to provide a vehicle for carrying freight and passengers which comprises an airplane flexibly connected to a plurality of boats adapted to rest on and be propelled through water.

Another object of my invention is to provide a water vehicle for carrying freight and passengers which embodies a plurality of boats adapted to rest on and be propelled through water and an airplane flexibly connected to the boats for lessening the weight of the boats in the water, whereby the vehicle may be propelled with greater speed than ordinarily for long distances.

Other objects more or less apparent will present themselves or will be specifically pointed out in the description to follow.

In the accompanying drawings which illustrate the preferred form of my invention:

Fig. 1 is a top plan view of a vehicle constructed in accordance with my invention, showing a part of the wing structure broken away; and Fig. 2 is a front view of the same.

Referring to the drawing, the numeral 1 represents boats which are adapted to rest on water, having suitable compartments therein for the holding of gasoline or other supplies and suitable motors 2 for the turning of the propellers 3. The boats are rigidly held together by a joining member 4 which is suitably secured to the sides of the boats by any suitable means such as screws, bolts or welding. The joining member 4 is provided centrally therein with a seat 5 within which is adapted to rest the fuselage 6 of an airplane. Suitably attached to the fuselage 6 in the usual manner is a wing 7 which is large enough in size to give a maximum amount of lifting power. The fuselage is preferably provided with a cockpit 8 and suitable space in its interior for the carrying of passengers or freight. The fuselage 6 is flexibly joined to the boats 1 by a plurality of cables 9 which are wound around drums 10 that are secured to the boats. Springs 11 which are attached around the drums 10 serve to wind the cables 9 on the said drums when the airplane drops toward the boats and rests in the seat 5. The flexible means connecting the airplane and boats may comprise other constructions equally as satisfactory as that described, it not being intended that the invention be confined to the exact form illustrated and described.

The boats are provided with rudders 12 which are associated with suitable gears and electrical means 13 for manipulation purposes. Electrical wiring connections 14 leading from the electrical means and gears 13 to the cockpit 8 permits the operator of the vehicle to manipulate the rudders 12 from the airplane. Other electrical wiring connections 15 leading from the motors 2 to the cockpit permit the independent controlling of the said motors. The boats 1 may be manipulated in various directions by independently controlling the speed of rotation of the propellers 3 through the wiring connections 15.

Flexible tubes 16 connecting the motor of the airplane with the gasoline contained in the compartments in the boats, serve as means for supplying fuel to operate the propeller 17 of the said airplane. Any suitable means such as drums heretofore described may be used to take up the slack of the wiring connections 14 and 15 and the tubes 16 when the airplane drops toward the boats 1.

For the sake of brevity and clearness I have omitted showing or describing in detail the various means employed for controlling the rudders 12 and the motors 2, it being understood that any of the well-known electrical means adapted for such purposes may be satisfactorily used.

Although I have shown a plurality of boats adapted to rest on and be propelled through water, it is of course evident that but one boat could be satisfactorily employed to perform the functions which the two boats are capable of performing. Likewise other means for flexibly joining the boats and airplane together may be satisfactorily used in lieu of the cables shown and described herein. I therefore desire my invention included broadly within the spirit of the appended claim rather than confined to the exact construction shown and described.

Having described my invention, what I claim is:

A vehicle comprising a boat having a rudder, a motor operated air traction propeller and a fuel compartment, an airplane adapted to be supported by the boat, flexible means connecting the boat and the airplane whereby the airplane may rise above the boat and still be connected thereto, means connecting the airplane and boat for controlling the rudder, and means connecting the fuel compartment of the boat and the airplane whereby fuel may be supplied for the operating of the airplane.

LEON F. DOUGLASS.